United States Patent [19]

Baumgartner

[11] 3,826,318

[45] July 30, 1974

[54] DIGITAL WEIGHING SCALE WITH AN INCREMENTAL MEASURING SYSTEM

[75] Inventor: Alfons Baumgartner, Grassau, Germany

[73] Assignee: Dr. Johannes Heindenhain, Trannreut, Germany

[22] Filed: June 22, 1972

[21] Appl. No.: 265,308

[30] Foreign Application Priority Data
June 22, 1971 Germany.................... 2130840

[52] U.S. Cl.................... 177/25, 177/1, 177/3, 177/50, 177/DIG. 3, 177/DIG. 6, 235/151.33
[51] Int. Cl. ................ G01g 23/10, G01g 23/365
[58] Field of Search .......... 177/1, 3, 25, 50, DIG. 1, 177/DIG. 3, DIG. 6; 235/151.33

[56] References Cited
UNITED STATES PATENTS

| | | | |
|---|---|---|---|
| 3,130,802 | 4/1964 | Bell................................. | 177/DIG. 1 |
| 3,193,032 | 7/1965 | Martin............................. | 177/DIG. 6 |
| 3,315,067 | 4/1967 | Bell et al......................... | 177/25 X |
| 3,439,760 | 4/1969 | Allen............................... | 177/25 X |
| 3,612,842 | 10/1971 | Aga et al. ..................... | 177/3 X |
| 3,674,097 | 7/1972 | Gile................................. | 177/25 X |

*Primary Examiner*—Stephen J. Tomsky
*Assistant Examiner*—Vit W. Miska
*Attorney, Agent, or Firm*—Granger Cook, Jr.; Jerold A. Jacover

[57] ABSTRACT

A digital scale having an incremental measuring system is disclosed. The scale includes a source of light, a weight-indicating movable grid and a stationary grid all in optical alignment, the two grids having alternately disposed transparent and nontransparent vertical surfaces, wherein the upper portions of said surfaces on the stationary grid are slightly offset from the lower portions thereof. Photoelectric means produce a series of leading and lagging electrical signals when the movable grid moves in response to a load placed on the scale, the signals from the upper portions of the stationary grid leading when the weight indicated by the movable grid is increasing, and the signals from the lower portions leading when the weight is decreasing. An electrical discriminator discerns which signals are leading, and converts them to electrical impulses which are passed to a count-up—countdown counter for recording the weight. Testing circuitry, which determines when the scale is substantially still, produces electrical information for energizing digital means, connected to the counter at that time. During substantial movement of the scale, however, the testing circuit prevents the digital means from being energized, thereby assuring weight readings only when the scale is substantially still.

8 Claims, 4 Drawing Figures

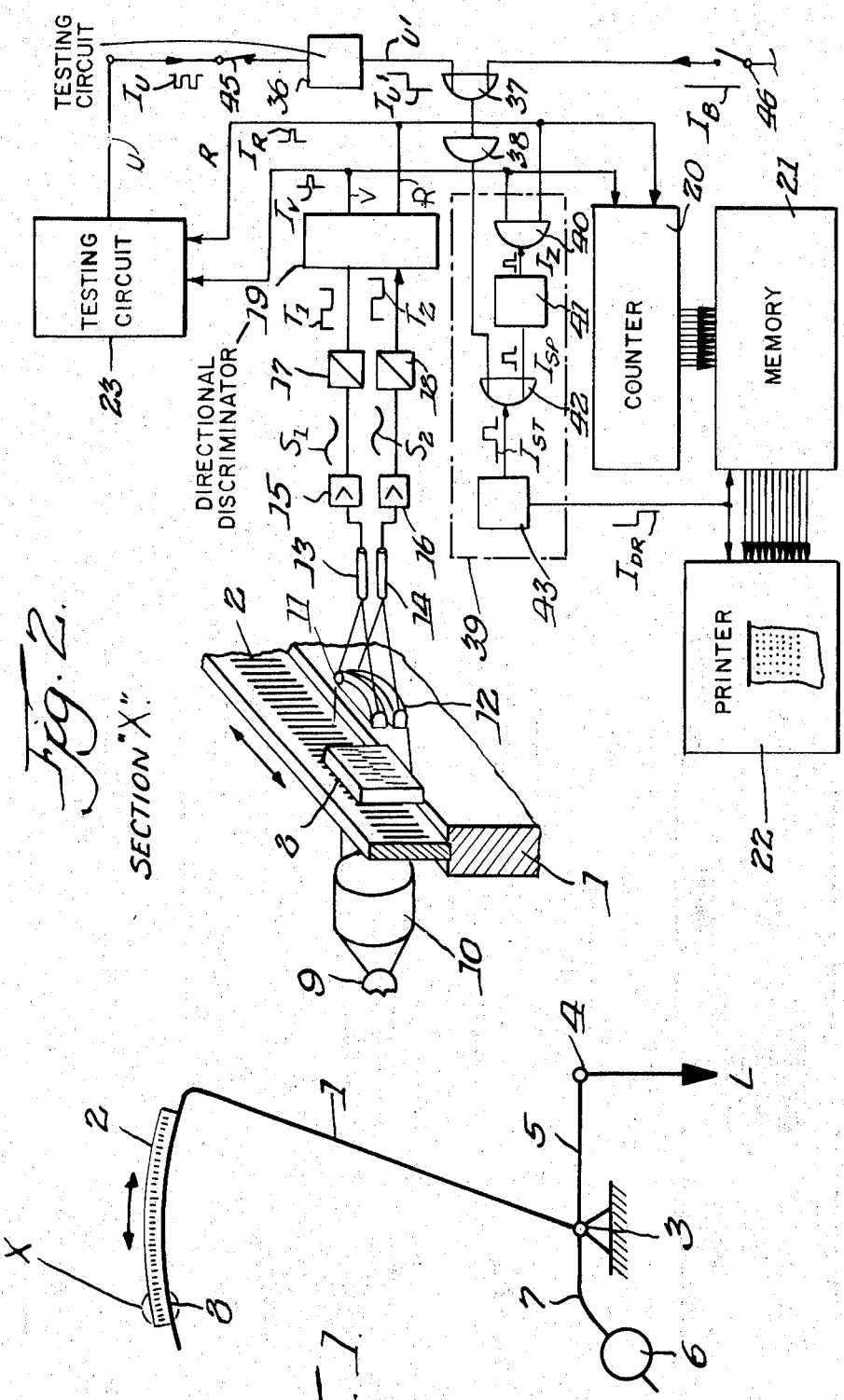

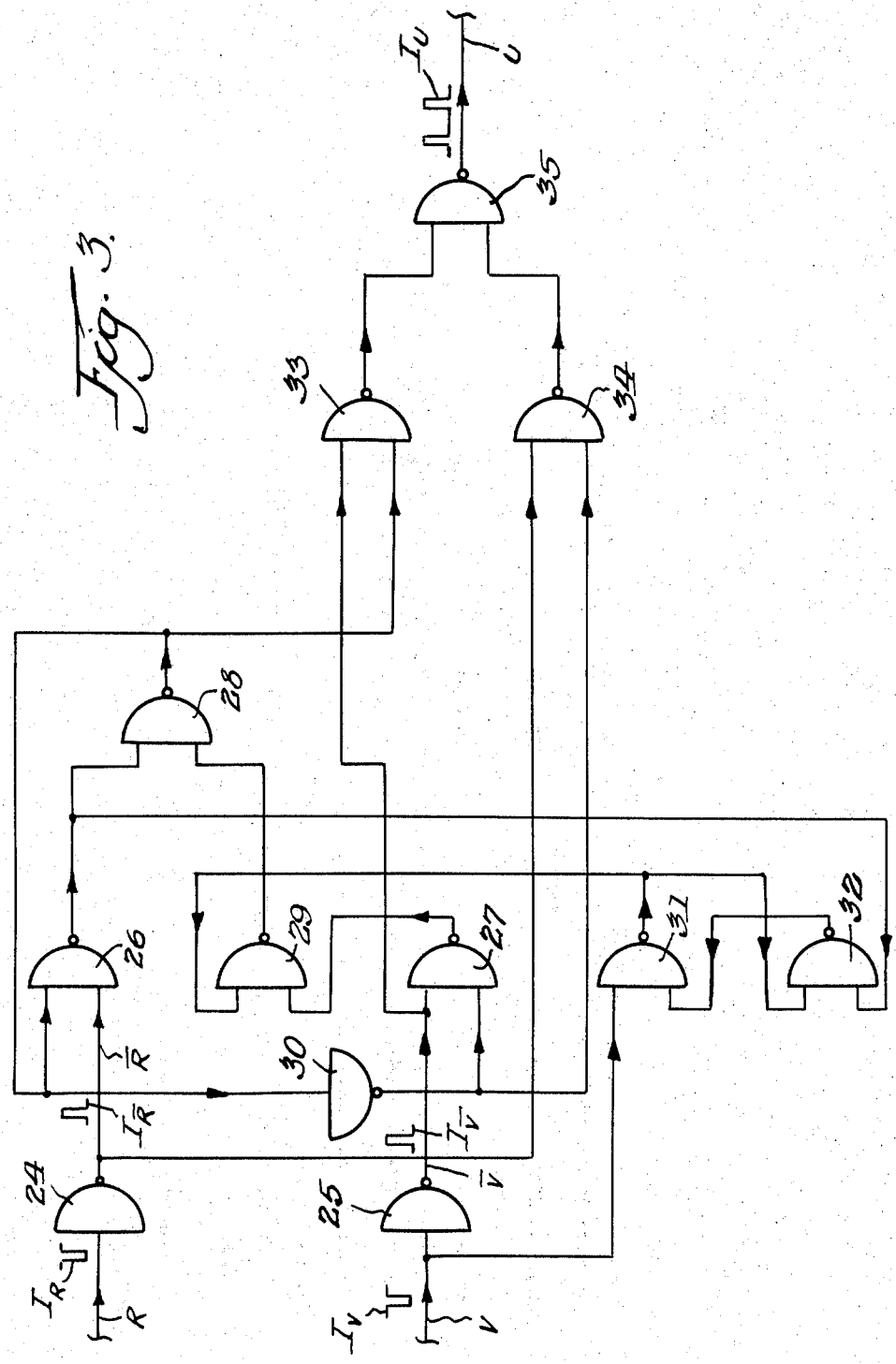

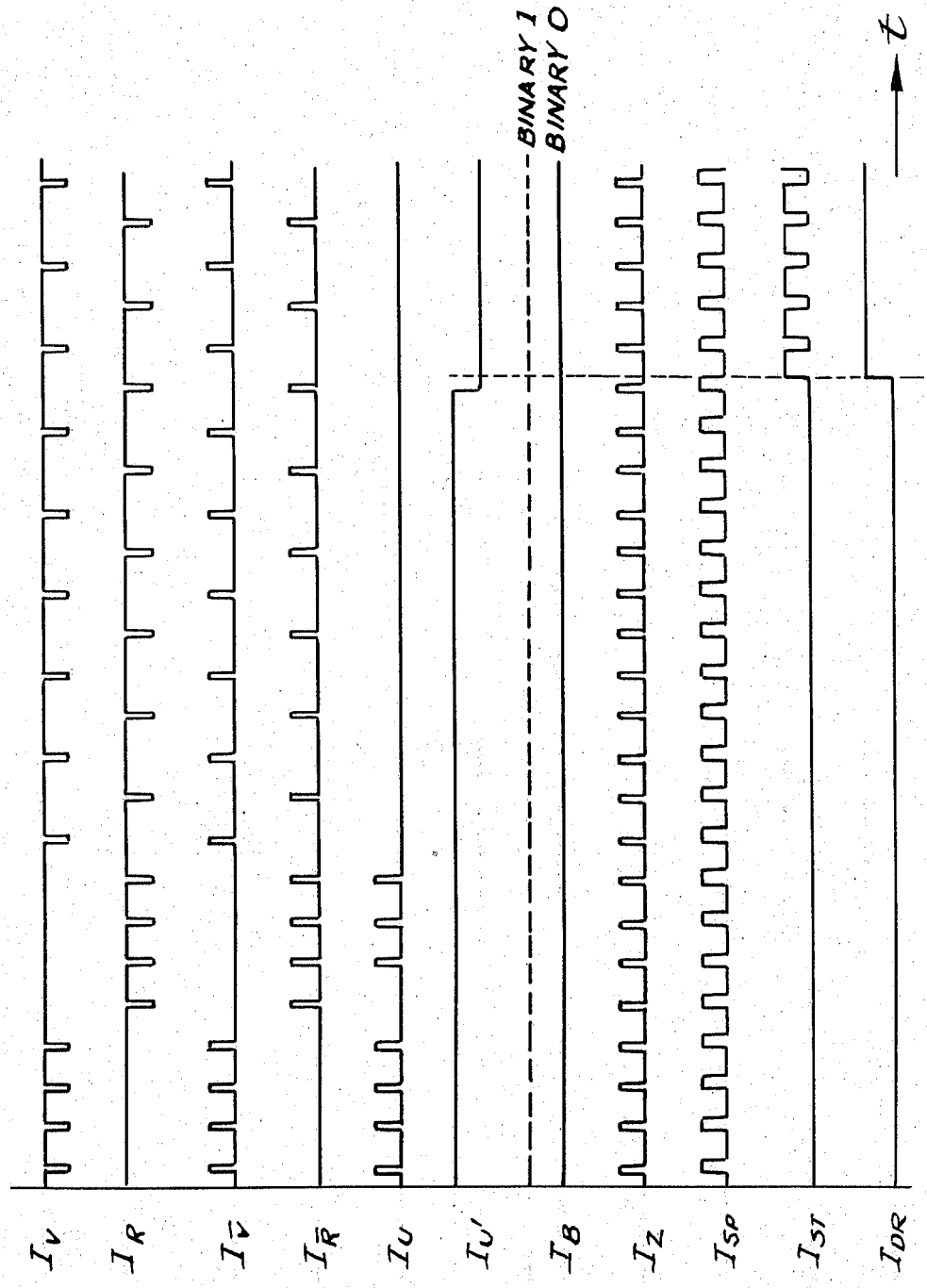

DIGITAL WEIGHING SCALE WITH AN INCREMENTAL MEASURING SYSTEM

This invention relates to a scale with an incremental measuring system which delivers in function of weight, a corresponding number of impulses via a directional discriminator to a count-up—countdown counter.

The value of the weight to be determined may be printed out at a digital printer, for example, or be processed further in a comparator.

According to prior art, scales without a digital electrical measuring system comprises an electrical stop indicator apparatus. In these scales, a slotted or foraminous disk, or the like, is connected to the scale pendulum and scanned by stationarily mounted photo elements. The presence or absence of electrical signals is thereby a criterion for determining whether or not the scale is oscillating. Scales of this kind either operate inexactly, because no definite recording of the weight values is possible due to the vibrations to which a load placed on the scale is subjected, or they operate through means of an electrical analogous technique, so that they are inappropriate for digital electrical measuring systems.

In contrast thereto, the present invention makes possible, in a scale with an incremental measuring system, a clear issuance or reading of posted weight values, without alternating in the borderline position between two consecutive readings.

The present invention solves the problem posed in a scale with an incremental measuring system of the kind initially described, in that the impulse sequences at the output of the directional discriminator are also enlisted as a criterion to determine when the scale is oscillating and when it is substantially still.

In the scale according to the invention, a circuit is provided which signals the moment an electrical impulse appears at either one of two outputs of the directional discriminator, but only when that electrical impulse is preceded by a predetermined number of electrical impulses at the same output without interruption by electrical impulses from the other output. If an electrical impulse is not preceded by said predetermined number, electrical information will be generated after a certain span of time t following this moment, indicating that the scale is substantially still. This time delay t thus permits the electrical information to be generated only when scale oscillations of substantially small amplitudes occur.

It is a primary object of this invention to provide an improved digital scale having an incremental measuring system.

It is another object of this invention to provide, in a digital scale having an incremental measuring system, electronic means for determining when the scale is subject to oscillations of substantially small amplitudes.

Other objects, features and advantages will be apparent upon reading the following detailed description of the invention in conjunction with the accompanying drawings.

FIG. 1 schematically shows a scale to which the invention shall be applied;

FIG. 2 shows an enlargement of a cutout X of FIG. 1 along with the circuit arrangement according to the invention;

FIG. 3 shows a testing circuit for FIG. 2;

FIG. 4 is a signal sequence table relating to FIGS. 2 and 3.

FIG. 1 schematically represents an inclination scale. A grid graduation 2 not linearly graduated of an incremental measuring system is provided at the inclination lever 1. As a result of the nonlinear grid graduation 2 a proportionality is established between the deflection of the inclination lever 1 and the load L. The inclination lever 1 is pivotable via a blade bearing 3. The load L acts via a blade or knife edge bearing 4 upon the load arm 5. A counterweight 6 at arm 7 provides the resetting force.

FIG. 2 shows the entire luminous-electrical grid scanning system. The grid graduation 2 is scanned by a stationarily mounted grid scanning plate 8. Grids 2 and 8 are provided with alternately transparent and nontransparent vertical surface areas. The upper surface areas of scanning plate 8 are offset or staggered from the lower surface areas thereof by approximately one-fourth of the distance between the transparent and nontransparent surface areas. Grids 2 and 8 are illuminated by a lamp 9 via a condenser 10. Upper objective 11 and lower objective 12 concentrate the clusters of light passing across the scanning plate 8 upon the photo elements 13 and 14, respectively. Because the upper surface areas of grid 8 are offset from the lower areas thereof, however, the clusters of light passing through upper objective 11 leads the clusters of light passing through lower objective 12.

The electrical output signals of the photo elements 13 and 14 are reinforced in amplifiers 15 and 16. The amplified signals $S_1$ and $S_2$ are converted in Schmitt triggers 17 and 18 into rectangular signal $T_1$, characterized as leading, and a rectangular signal $T_2$, characterized as lagging, when inclination lever 1 is registering increasing weight in response to the application of load L on knife edge bearing 4. When inclination lever 1 overshoots the weight of load L, and begins compensating therefor by registering a decreasing weight, signal $T_1$ becomes lagging and signal $T_2$ becomes leading. The rectangular signals $T_1$ and $T_2$ are passed to a conventional directional discriminator 19, which discerns which of signals $T_1$ and $T_2$ are leading and lagging through the well-known technique for measuring lengths or angles by reversible counting of pulses. Upon receipt of signals $T_1$ and $T_2$, directional discriminator 19 produces impulses at output V if signal $T_1$ is leading, and at output R id signal $T_2$ is leading. Output V is connected to the forward input of an electric count-up — countdown counter 20, output R is connected to the reverse input of electronic count-up — countdown counter 20. Count-up — countdown counter 20 controls, via a member 21, a building unit 22 which, in the preferred embodiment, is a digital printer.

The impulses $I_V$ and $I_R$ at outputs V and R of directional discriminator 19 are fed into a testing circuit 23. Testing circuit 23 has an output V which signals at the moment an impulse appears at output V or R of directional discriminator 19, but only if that impulse which is preceded by a predetermined number of electrical impulses from the same output, without interruption by electrical impulses from the other output. If an electrical impulse is not preceded by said predetermined number, the output of testing circuit 23 will remain at a minimal level, indicating the scale is subject to oscillations of substantially small amplitude, and is therefor substantially still. FIG. 3 shows a possible logical circuit for carrying out said test in which testing circuit 23 produces an output impulse after two consecutive electrical impulses have been received from the same output of discriminator 19. The testing circuit according to FIG. 3 is accommodated in the circuitry shown in FIG. 2.

The impulses $I_V$ and $I_R$ arrive at testing circuit 23 via inversion members 25 and 24. The outlet $\overline{R}$ of the member 24 is placed at a NAND gate 26, and outlet $\overline{V}$ of member 25 is placed at a NAND gate 27. The outlet of a NAND gate 28 is connected to the other input of the NAND gate 26. The output of the NAND gate 26 and 29 is placed at the inputs of the NAND gate 28. An inversion member 30 also is provided at the output of the NAND gate 28, the output of said member 30 being placed at the other input of the NAND gate 27. The output of the NAND gate 27 is connected to one input of the NAND gate 29.

The outlet V of the directional discriminator 19 is placed at a NAND gate 31, whose other input is connected to the output of a NAND gate 32. The outlet of NAND gate 31 and the outlet of NAND gate 26 are placed at the inputs of the NAND gate 32. The output of the NAND gate 31 is connected furthermore to the second input of the NAND gate 29. The outlet V of the inversion member 25 and the output of the NAND gate 28 are also connected to an NAND gate 33, whose output together with the output of a NAND gate 34 is placed to an additional NAND gate 35. The outlet of the inversion members 24 and 30 are connected to the inputs of the NAND gate 34.

The outlet U of the NAND gate 35 is connected to a timing member 36 (FIG. 2) which may be a monostable sweep phase. The time constant t of the timing member 36 is tuned according to the mechanical attenuation of the scale. Timing member 36 has an output $U'$ which, as indicated by signal $I_{U'}$ in FIG. 4, is generally at a binary 1 condition. However, when signal $I_U$ from testing circuit 23 is at a minimal level, and has remained at said level for a predetermined period of time indicating the scale is substantially still, timing member 36 will switch to a binary 0 condition. This electrical information is used to commence digital weight readout in a manner explained in greater detail hereinafter.

The functional table for the testing circuit according to FIG. 3 reads as follows in the time sequence for the impulse IV and $I_R$ shown in FIG. 4:

| $I_V$ | $I_R$ | $I_U$ | $I_{U'}$ |
|---|---|---|---|
| 0 | 0 | 0 | 1 |
| 1 | 0 | 1 | 1 |
| 0 | 0 | 0 | 1 |
| 1 | 0 | 1 | 1 |
| 0 | 0 | 0 | 1 |
| 1 | 0 | 1 | 1 |
| 0 | 0 | 0 | 1 |
| 1 | 0 | 1 | 1 |
| 0 | 0 | 0 | 1 |
| 0 | 1 | 0 | 1 |
| 0 | 0 | 0 | 1 |
| 0 | 1 | 1 | 1 |
| 0 | 0 | 0 | 1 |
| 0 | 1 | 1 | 1 |
| 0 | 0 | 0 | 1 |
| 0 | 1 | 1 | 1 |
| 1 | 0 | 0 | 1 |
| 0 | 0 | 0 | 1 |
| 0 | 1 | 0 | 1 |
| 0 | 0 | 0 | 1 |
| 1 | 0 | 0 | 1 |

-Continued

| $I_V$ | $I_R$ | $I_U$ | $I_{U'}$ |
|---|---|---|---|
| 0 | 0 | 0 | 1 |
| 0 | 1 | 0 | 1 |
| 0 | 0 | 0 | 1 |
| 1 | 0 | 0 | 1 |
| 0 | 0 | 0 | 1 |
| 0 | 1 | 0 | 1 |
| 1 | 0 | 0 | 1 |
| 0 | 0 | 0 | 1 |
| 0 | 1 | 0 | 1 |
| 0 | 0 | 0 | 1 |
| 1 | 0 | 0 | 1 |
| 0 | 0 | 0 | 1 |
| 0 | 1 | 0 | 1 |
| 0 | 0 | 0 | 1 |
| 1 | 0 | 0 | 1 |
| 0 | 0 | 0 | 1 |
| 0 | 1 | 0 | 0 |
| 0 | 0 | 0 | 0 |
| 1 | 0 | 0 | 0 |
| 0 | 0 | 0 | 0 |
| 0 | 1 | 0 | 0 |
| 0 | 0 | 0 | 0 |
| 1 | 0 | 0 | 0 |
| 0 | 0 | 0 | 0 |
| 0 | 1 | 0 | 0 |
| 0 | 0 | 0 | 0 |
| 1 | 0 | 0 | 0 |
| 0 | 0 | 0 | 0 |

The functional table shows that the testing circuit signals that the seal is substantially still when an alternating sequence of impulses $I_V$ and $I_R$ occurs within a substantially short period of time.

The output $U'$ of the time member 36 is connected to the input of a NOR gate 37. At the other input of the NOR gate 37 the impulses of a command transmitter 46 become effective. The outlet of the NOR gate 37 is placed at an inversion member 38 whose output is connected together with the outlet V and R of the directional discriminator 19 to a construction unit 39. The construction unit 39 causes the take-over of the reading to be prevented for a short time in each case at the jumping points of the scanning signals $T_1$ and $T_2$. The construction unit 39 moreover causes the memory 21 to be held firmly in each case when readings are called, until the take-over of the message is concluded in the reading value printer 22. The interval during which the transfer of the reading is interrupted for a short time at the signal jump is tuned to electrical passage times in the counter 20 and in the memory 21.

The building unit 39 comprises a NAND gate 40, with outputs V and R of the directional discriminator 19 being connected to its inputs. The NAND gate 40 delivers in each case at the jumping points of signals $T_1$ and $T_2$ impulses $I_Z$ (FIG. 4) to a time member 41. The time constant of the time member 41 is tuned to electrical passage times in the counter 20 and in the memory 21. The time member 41, which may be a monostable sweep phase, controls a NOR gate 42, the output of an inversion member 38 adhering to its other input. If the impulse $I_{U'}$ at the output $U'$ of the time member 36 jumps from binary 1 to binary 0, and if the impulse $I_{SP}$ (FIG. 4) also changes at the output of the time member 41 from binary 1 to binary 0, a change of condition from binary 0 to binary 1 occurs at the output of the NOR gate 42. The impulse $I_{ST}$ present (FIG. 4) at the output of NOR gate 42 sets another time member 43 which may also be a monostable sweep phase. The time constant of the time member 43 is tuned to the time span the printer 22 of the readings needs for complete transfer of messages from memory 21. An impulse $I_{DR}$ at the outlet of the time member 43 thus causes the memory 21 to be held firmly until the printer 22 has completed the taking over of the reading. At the same time the readiness for taking over the reading is established during the condition change from binary 0 to binary 1 at the output of the time member 43 in the printer 22.

The testing unit 23 controlling the oscillating of the scale can be put out of operation by opening a switch 45 mounted in the conduit branch U. It is possible to prevent the printing out of weighing results by closing the switch 46.

I claim:

1. A digital scale comprising:

incremental measuring means, for indicating the weight of a load placed on said scale, subject to oscillations of varying amplitudes about the weight of said load;

signal generation means having a first terminal producing a series of first-characterized signals and a second terminal producing a series of second-characterized signals when said incremental measuring means are indicating increasing weight; said first terminal producing a series of said second-characterized signals and said second terminal producing a series of said first-characterized signals when said incremental measuring means are indicating decreasing weight;

discrimination means, having a first output and a second output, for distinguishing said first-characterized signals from said second-characterized signals, and for producing a corresponding series of electrical impulses at said first output upon receipt of said first-characterized signals from said first terminal, and producing a corresponding series of electrical impulses at said second output upon receipt of said first-characterized signals from said second terminal; the duration in which electrical impulses are alternately produced at said first and second outputs corresponding to the amplitude of said oscillations of said incremental mesuring means;

counting means, adding the electrical impulses received from said first output and subtracting the electrical impulses received from said second output, to register the weight of said load;

digital means, coupled to said counting means, for representing the weight of said load in digital form upon energization of said digital means; and testing means, coupled to said discrimination means, for determining the duration in which electrical impulses are alternately produced at said first output and said second output; said testing means producing electrical information to energize said digital means when said duration is substantially small, whereby said digital means are energized only when said incremental measuring means are subject to substantially small oscillations.

2. The digital scale receited in claim 1 wherein said incremental measuring means include a movable grid and a stationary grid, each having alternating transparent and nontransparent vertical surface areas, the upper portion of said vertical surface areas of said stationary grid being offset relative to the lower portion of said vertical surface areas of said stationary grid.

3. The digital scale recited in claim 2 wherein said signal generation means include a source of light aligned behind said movable grid and said stationary grid, producing a leading light signal when said light is passed through the transparent upper portions of said stationary grid and a lagging light signal when said light is passed through the transparent lower portions of said stationary grid when said incremental measuring means indicate increasing weight; said source of light producing a lagging light signal when said light is passed through the transparent upper portions of said stationary grid and a leading light signal when said light is passed through the transparent lower portions of said stationary grid when said incremental measuring means indicate decreasing weight.

4. The digital scale recited in claim 3 wherein said signal generation means further include photoconductor means for respectively converting said leading and lagging light signals into a series of leading electrical pulses and a series of lagging electrical pulses.

5. The digital scale recited in claim 1 wherein said testing means include electronic logic for producing an output impulse when an electrical impulse received from one of said outputs of said discrimination means was immediately preceded by an electrical impulse from the same output; said logic circuit producing no output impulse when an electrical impulse received from one of said outputs of said discrimination means was not immediately preceded by an electrical impulse from the same output.

6. The digital scale recited in claim 5 wherein said testing circuit further includes delay means coupled to said electronic logic, normally displaying a first voltage state; said delay means switching to a second voltage state when no output impulse is received from said electronic logic for a predetermined time; said delay means energizing said digital means after switching to said second voltage state.

7. The digital scale recited in claim 5 wherein said predetermined time is greater than the time required to produce two of said electrical impulses by said discrimination means.

8. The digital scale recited in claim 1 further includes a construction unit coupled between said testing means and said digital means for delaying passage of said electrical information to said digital means until after any existing electrical impulse produced by said discrimination means is dissipated.

* * * * *

UNITED STATES PATENT OFFICE
CERTIFICATE OF CORRECTION

Patent No. 3,826,318            Dated July 30, 1974

Inventor(s) Alfons Baumgartner

It is certified that error appears in the above-identified patent and that said Letters Patent are hereby corrected as shown below:

In the Assignee designation, the name "Trannreut" should be spelled --Traunreut--.

Column 2, Line 34, after "$T_2$" change "." to --,--.

Line 48, change "id" to --if--.

Column 3, Line 48, change "IV" to --$I_{\overline{V}}$-- and change "$I_R$" to --$I_{\overline{R}}$--.

Column 4, Line 28, change "$I_V$" to --$I_{\overline{V}}$-- and change "$I_R$" to --$I_{\overline{R}}$--.

Signed and sealed this 24th day of December 1974.

(SEAL)
Attest:

McCOY M. GIBSON JR.
Attesting Officer

C. MARSHALL DANN
Commissioner of Patents

UNITED STATES PATENT OFFICE
CERTIFICATE OF CORRECTION

Patent No. 3,826,318    Dated   July 30, 1974

Inventor(s)   Alfons Baumgartner

It is certified that error appears in the above-identified patent and that said Letters Patent are hereby corrected as shown below:

Column 2, line 1, change "is" to --shows--.

line 57, change "V" to --U--.

Column 3, line 27, change "an" to --a--.

Column 4, line 27, change "seal" to --scale--.

Signed and sealed this 17th day of June 1975.

(SEAL)
Attest:

RUTH C. MASON  
Attesting Officer

C. MARSHALL DANN  
Commissioner of Patents  
and Trademarks